United States Patent
Stau et al.

(10) Patent No.: US 9,758,111 B2
(45) Date of Patent: Sep. 12, 2017

(54) PLASTIC HOLDER FOR ANTI-VIBRATION FASTENING AN ELONGATED OBJECT

(71) Applicant: NEWFREY LLC, Newark, DE (US)

(72) Inventors: Bastian Stau, Giessen (DE); Lothar Schliessner, Giessen (DE)

(73) Assignee: NEWFREY LLC, New Britain, CT (US)

(*) Notice: Subject to any disclaimer, the term of this patent is extended or adjusted under 35 U.S.C. 154(b) by 0 days.

(21) Appl. No.: 14/872,758

(22) Filed: Oct. 1, 2015

(65) Prior Publication Data
US 2016/0096492 A1    Apr. 7, 2016

(30) Foreign Application Priority Data
Oct. 1, 2014  (DE) .................. 10 2014 114 275

(51) Int. Cl.
*F16L 3/22*    (2006.01)
*B60R 16/00*   (2006.01)
(Continued)

(52) U.S. Cl.
CPC .......... *B60R 16/00* (2013.01); *B60R 16/0215* (2013.01); *F16L 3/13* (2013.01); *F16L 3/223* (2013.01); *F16L 3/227* (2013.01); *F16L 3/237* (2013.01); *F16L 55/035* (2013.01); *H02G 3/32* (2013.01)

(58) Field of Classification Search
CPC ....... F16L 3/00; F16L 3/08; F16L 3/12; F16L 3/1236; F16L 3/223; F16L 3/22; F16L 3/23; F16L 3/237; F16L 55/035; F16L 3/13; F16L 3/227; A47B 2097/003; H02G 3/22; H02G 3/30; H02G 3/32; B60R 16/0215; B60R 16/00

USPC ......... 248/49, 65, 67.7, 68.1, 71, 74.1, 74.2, 248/912, 62, 73, 74.3
See application file for complete search history.

(56) References Cited

U.S. PATENT DOCUMENTS 5,190,251 A * 3/1993 Bodo ...................... F16L 3/237
                                                     248/224.7
5,464,179 A * 11/1995 Ruckwardt ............... F16L 3/13
                                                      248/68.1
(Continued)

FOREIGN PATENT DOCUMENTS

DE    19752525 C    11/1997
GB     2166794 A     5/1986
WO    02065009 A     8/2002

OTHER PUBLICATIONS

EP Search Report dated Feb. 5, 2016.

*Primary Examiner* — Leslie A Nicholson, III
*Assistant Examiner* — Taylor Morris
(74) *Attorney, Agent, or Firm* — Michael P. Leary

(57) ABSTRACT

A holder made of plastic for vibration-insulating attachment of an oblong object such as a pipe or the like to a vehicle includes a base part with a bolt-accommodating opening and retainer parts that have a U-shaped retaining section with a recess that has a hollow inner surface and an insertion opening at which a resilient retaining finger is provided, which is able to hold an oblong object in the recess. The retainer parts are connected to the base part by means of thin, flexible wall elements. The base part has a frame with openings and the apex regions of the retaining sections on the side opposite from the insertion opening can move into these openings.

15 Claims, 2 Drawing Sheets

(51) Int. Cl.
*B60R 16/02* (2006.01)
*F16L 3/223* (2006.01)
*F16L 55/035* (2006.01)
*H02G 3/32* (2006.01)
*F16L 3/13* (2006.01)
*F16L 3/227* (2006.01)
*F16L 3/237* (2006.01)
*F16B 15/00* (2006.01)
*F16B 45/00* (2006.01)
*F16L 3/00* (2006.01)
*F16L 3/08* (2006.01)
*F16L 3/12* (2006.01)

(56) References Cited

U.S. PATENT DOCUMENTS

| | | | |
|---|---|---|---|
| 5,588,683 A * | 12/1996 | Schliessner | F16L 3/223 248/60 |
| 5,954,300 A * | 9/1999 | Sturies | F16L 3/20 248/68.1 |
| 6,152,406 A * | 11/2000 | Denndou | F16L 3/221 248/68.1 |
| 6,241,198 B1 | 6/2001 | Maruyama | |
| 6,641,093 B2 * | 11/2003 | Coudrais | F16L 3/13 248/68.1 |
| 7,036,775 B2 | 5/2006 | Nakanishi | |
| 7,207,528 B2 * | 4/2007 | Kato | F16L 3/13 248/55 |
| 7,614,589 B2 * | 11/2009 | Kato | F16L 3/223 248/55 |
| 2004/0007648 A1 * | 1/2004 | Miura | F16L 3/13 248/71 |
| 2005/0079756 A1 | 4/2005 | Kawai et al. | |
| 2005/0139732 A1 | 6/2005 | Kato | |
| 2005/0284989 A1 * | 12/2005 | Mizukoshi | F16L 55/035 248/65 |
| 2009/0166489 A1 * | 7/2009 | Volchko | F16L 3/223 248/205.1 |

* cited by examiner

PLASTIC HOLDER FOR ANTI-VIBRATION FASTENING AN ELONGATED OBJECT

CROSS-REFERENCE TO RELATED APPLICATION

This application claims priority from German Patent Application No. DE 102014114275.6, filed on Oct. 1, 2014, the disclosure of which is incorporated herein by reference.

BACKGROUND OF THE INVENTION

The invention relates to a holder made of plastic for vibration-insulating attachment of an oblong object such as a pipe or the like to a vehicle, having a base part in which a bolt-accommodating opening is provided and having a retainer part that is integrally formed onto the base part and has a retaining section formed by a wall with a U-shaped cross-section, with a recess that is suitable for accommodating the oblong object and has a hollow inner surface and an insertion opening oriented away from the base part; a resilient retaining finger that protrudes into the recess is provided at the insertion opening and is able to hold the oblong object in the recess; the retainer part is connected to the base part by means of one or more thin, flexible wall element(s) and is secured to the base part without directly touching it.

Holders of the above-described type are known from U.S. Pat. Nos. 6,241,198 and 7,036,775. They are primarily used for fastening pipes such as fuel lines, brake lines, or cables in vehicles and should produce an insulating or damping action to counteract the transmission of vibrations from the pipe to the vehicle or vice versa. Other requirements of such holders include a compact design that permits it to be mounted close to adjacent components, the production of powerful holding forces, a simple installation, and an inexpensive manufacture.

In the holder known from U.S. Pat. No. 6,241,198, an oblong base part is provided with a number of pipe-holding parts arranged in a row in the longitudinal direction of the base part and each connected to the other by means of a respective thin connecting element that is curved in a V shape. The pipe-holding parts at the ends are also connected by means of a thin elastic connecting element to an upright wall of the base part or of a bolt-accommodating part. Between the pipe-holding parts and the base part, hollow, tubular cushions are additionally provided, each cushion being connected to a pipe-holding part by means of an upper holding stem and connected to the base part by means of a lower holding stem. The tubular cushions produce a buffering action with regard to vibrations in the vertical direction. The V-shaped, thin elastic connecting elements are supposed to damp vibrations in the transverse direction. In this holder, due to the configuration of the tubular cushions, the pipes are spaced a relatively large distance apart from the base part. Therefore a correspondingly large amount of installation space is required, which limits the possibilities for using the holder.

US 2005/0139732 A1 has disclosed a holder made of plastic for vibration-insulating attachment of a pipe to the body of a vehicle in which a retainer part with a U-shaped cross-section is fastened to a base part by means of a vibration-absorbing unit. The vibration-absorbing unit is situated on the side of the retainer part oriented away from the insertion opening and is composed of two annular spring elements that are situated spaced apart from each other on the base part, that are each connected to the retainer part by means of a respective bent leaf spring element. Between the spring elements on the retainer element, a box-like frame part is provided and a T-shaped regulating element, which protrudes from the base part, engages in the frame part. The cooperation of the frame part and the regulating element limits the mobility of the retainer part relative to the base part and prevents separation of the retainer part from the base part if breakage of the spring elements occurs. Due to the configuration of the spring elements and the frame part, the retainer part and the pipe held in it are spaced a relatively large distance apart from the fastening surface to which the base part can be fastened.

BRIEF SUMMARY OF THE INVENTION

The object underlying the invention is to create a holder of the type mentioned at the beginning, which produces a vibration-insulating or damping attachment of an oblong object to a supporting element. The holder should also feature a low overall height and should permit an attachment of the oblong object or several oblong objects close to the fastening substrate. The holder must be easy to install and must ensure powerful withdrawal [sic] forces preventing detachment of the attached objects. The holder should also be inexpensive to manufacture and require a low amount of material for its manufacture.

According to the invention, the stated object is attained by means of a holder having the features disclosed in claim 1. Advantageous modifications of the holder are disclosed in the dependent claims.

According to the invention, in order to produce a vibration-insulating attachment of an oblong object such as a pipe or the like to a vehicle, the plastic holder has a base part in which a bolt-accommodating opening is provided and a retainer part that is integrally formed onto the base part and has a retaining section formed by a wall with a U-shaped cross-section, with a recess that is suitable for accommodating the oblong object and has a hollow inner surface and an insertion opening oriented away from the base part; a resilient retaining finger that protrudes into the recess is provided at the insertion opening and is able to hold the oblong object in the recess; the retainer part is connected to the base part by means of one or more thin, flexible wall element(s) and is secured to the base part without directly touching it; and the base part has a frame-shaped support section with an opening provided in it, which is adjacent to an apex region of the U-shaped wall on its side opposite from the insertion opening and into which the apex region can move when a deformation of the flexible wall element occurs.

In the holder according to the invention, the base part has an opening into which the retainer part can protrude with its apex region oriented toward the base part when it is moved relative to the base part as a result of vibrations. As a result, the retainer part can be situated very close to the base part without hindering the mobility of the retainer part relative to the base part and thus impairing the associated vibration insulation. The spatial proximity between the retainer part and the base part permits low space requirements for the installation of the holder and also a short distance between the oblong objects held by the holder and the substrate against which the base part rests and to which it is fastened.

The edge of the opening in the base part can also serve to limit the scope of the movement of the retainer part relative to the base part. This prevents the secured oblong objects from coming too close to the substrate. The support of the retainer part against the edge of the opening of the base part also provides a stabilization of the retainer part as the oblong objects are being inserted during installation and prevents the thin, flexible wall element from being excessively deformed during installation. By means of the opening in the base part, the retaining section of the retainer part, particularly in the apex region, can be reinforced by means of a rib for example in order to produce more powerful holding forces without negatively affecting the short distance between the base part and retainer part and therefore the space requirements of the holder.

In a preferred embodiment of the holder, the frame-shaped support section can have a rectangular frame with two longitudinal elements that extend parallel to the U-shaped cross-section of the retaining section and two transverse elements that connect them; the longitudinal elements and the transverse elements define the opening with a rectangular edge. Each of the longitudinal elements or transverse elements can be provided with a reinforcing rib in order to increase the rigidity of the frame. This frame-shaped configuration of the support section permits a rigid, stable embodiment of the base part so that a single bolt-accommodating opening is sufficient for attaching the base part to a substrate.

According to another proposal of the invention, the holder can be embodied to accommodate a plurality of oblong objects; the retainer part has a plurality of retaining sections, each with a recess formed by a wall with a U-shaped cross-section for accommodating an oblong object; the retaining sections are arranged in a row so that their central U-shaped cross-sections lie in the same plane; and the frame-shaped support section of the base part extends along the apex region of the U-shaped walls of a plurality of retaining sections and has openings situated adjacent to their apex regions, into which the apex regions can move.

In order to simplify the retainer part, two adjacent retaining sections can be securely connected to each other to form a unit, which is connected to the base part by means of a respective thin, flexible wall element at each of the opposite ends. In this way, it is possible to reduce the number of thin, flexible wall elements, their attachments to the base part, and the amount of space they require.

Alternatively or in addition, adjacent retaining sections can be situated spaced apart from each other and connected to each other only by means of a thin, flexible wall element. The latter is particularly advantageous in retaining sections situated at the end of the row of retaining sections. In this case, the base part can be extended at the opposite ends by means of flat wall sections; the free ends of the flat wall sections are each connected to the retainer part situated at the end of the row by means of a respective thin, flexible wall element.

According to the invention, the bolt-accommodating opening is advantageously formed by a sleeve-like formation on the base part, which is situated on the side of the base part oriented toward the retainer part and is connected to the retainer part by means of a thin, flexible wall element.

On the side oriented away from the retainer part, the base part can also have a contact surface for contacting a substrate. In order to ensure a play-free support of the base part on the substrate to which it is fastened, the base part can have resilient fingers protruding from it, whose free ends are situated spaced apart from the plane defined by the contact surface. When the base part is attached to a substrate, the resilient fingers engage with the substrate and are elastically deformed by the pressure of the holder against the substrate, thus supporting the holder on the substrate in a play-free fashion.

BRIEF DESCRIPTION OF THE SEVERAL VIEWS OF THE DRAWINGS

The invention will be explained in greater detail below in conjunction with an exemplary embodiment that is shown in the drawings. In the drawings.

DETAILED DESCRIPTION OF THE PREFERRED EMBODIMENTS

Figure 1:
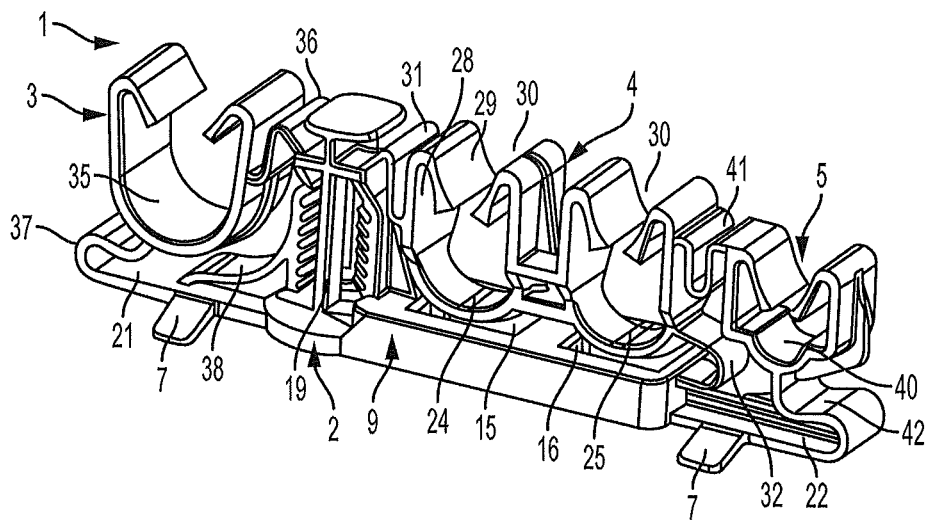
FIG. 1 is a perspective depiction of a holder according to the invention, viewed at an angle from above.
Figure 2:
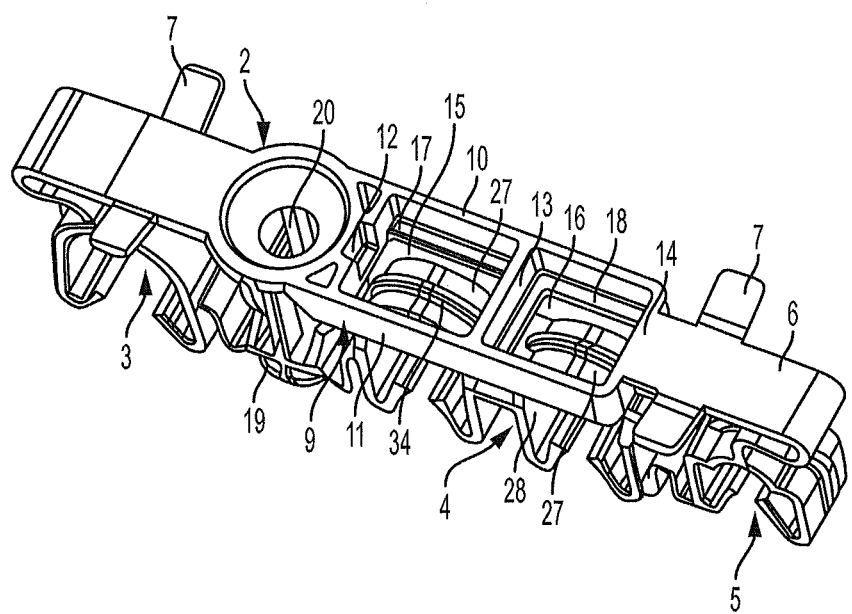
FIG. 2 is a perspective depiction of the holder according to FIG. 1, viewed at an angle from below.
Figure 3:
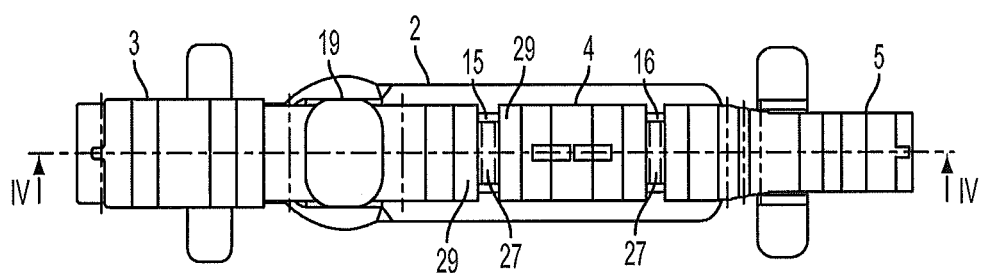
FIG. 3 is a top view of the holder according to FIG. 1.
Figure 4:
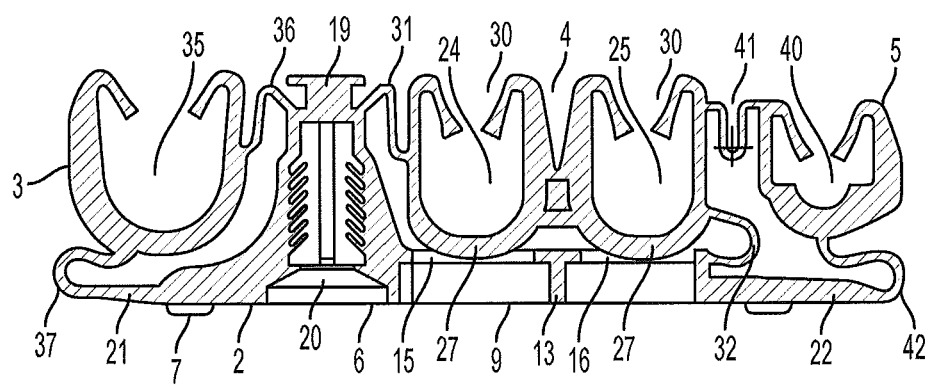
FIG. 4 is a cross-section through the holder according to FIG. 1 along the line IV-IV according to FIG. 3.

The holder 1 shown in the drawings is manufactured in the form of an injection-molded component made of plastic and includes an essentially rigid oblong base part 2 on which are arranged retainer parts 3, 4, 5 with retaining sections for receiving and holding oblong objects such as pipes or cables. The underside of the base part 2 oriented away from the retainer parts 3, 4, 5 is provided with a flat contact surface 6, which is designed to support the holder 1 on a substrate to which the holder 1 is fastened. Resilient fingers 7 that extend out laterally from the base part 2 protrude downward with their free ends beyond the plane of the contact surface 6 and should produce a resilient, play-free support of the holder 1 on the substrate supporting it.

In its middle region, the base part 2 is embodied in the form of a rectangular frame 9 that has two parallel longitudinal elements 10, 11 and transverse elements 12, 13, 14 connecting them. The transverse element 13 connects the longitudinal elements 10, 11 approximately in their middle and divides the frame 9 into two sections, each of which contains a rectangular opening 15, 16 extending through it. The longitudinal elements 10, 11 and the transverse element 13 are reinforced by internal ribs 17, 18, whose inner edge delimits the respective opening 15, 16.

Adjacent to the transverse element 12 of the frame 9, the base part 2 is provided with a sleeve-like formation 19, which extends upward perpendicular to the contact surface 6 and protrudes beyond the top surface of the frame 9. The formation 19 contains a bolt-accommodating opening 20 for receiving a fastening bolt that attaches the holder 1 to a substrate. Inside the bolt-accommodating opening 20, resilient detent pawls or comparable holding means are provided, which secure an inserted fastening bolt, which is provided with an external thread, in the bolt-accommodating opening 20.

The opposite ends of the base part 2 are composed of wall sections 21, 22, one of which adjoins the formation 19 and the other of which adjoins the frame 9. The wall sections 21, 22 are reinforced by means of ribs provided on their top surface.

The retainer part 4 is located on the top surface of the frame 9 and has two retaining sections 24, 25 that are situated next to each other and are securely fastened to each other. Each of the retaining sections 24, 25 has a wall that is essentially U-shaped in cross-section, which has an apex region 27 essentially in the form of a half-cylinder and two essentially parallel end regions 28, which extend upward essentially perpendicular to the frame 9. A guide opening 30 is situated between the free ends of the end regions 28. The free ends of the end regions 28 have resilient retaining fingers 29 formed onto them, which extend inward toward the apex region 27 at an angle to the end regions 28 and with their free ends, hold an oblong object in place once it has been inserted into the retaining section.

When a tubular object is inserted into a retaining section 24 or 25, the retaining fingers 29 and the end regions 28 are pushed apart from each other by the tubular object and the tubular object is moved beyond the retaining fingers 29 into a retaining position resting against the hollow inner surface of the apex region 27. In this position of the tubular object, the retaining fingers 29 spring back into their initial position and can thus hold the tubular object in the retaining section securely and in opposition to powerful withdrawal forces.

The retainer part 4 is secured to the base part by means of two thin, flexible wall elements 31 and 32. The wall element 31 is approximately the shape of an S (that is like a spring) and connects the end region 28 of retaining section 24 to the upper end of the formation 19. The wall element 32 is bent into a U shape and on the outside of the apex region 27, connects the retaining section 25 to the transverse element 14 of the frame 9.

The wall elements 31 and 32 secure the retainer part 4 to the base part 2 so that it can be moved to a limited degree in all directions in space, without colliding with the base part 2. Vibrations that do not exceed the free mobility of the retainer part 4 relative to the base part 2 are insulated by the flexible wall elements and only transmitted in a damped fashion.

In the apex region 27 of the retaining sections 24, 25, the openings 15, 16 in the frame 9 provide for the necessary freedom of movement of the retainer part 4. In this way, the retainer part 4 and therefore also the tubular objects contained in them can be situated close to the base part 2 and spaced a correspondingly short distance apart from the substrate that supports the base part 2. The clearance produced by the openings 15, 16 also makes it possible for the retaining sections 24, 25 to be provided with reinforcing ribs 34 on the outside of their apex regions 27 without having to correspondingly increase the distance between the retaining sections 24, 25 and the base part 2.

When tubular objects are inserted into the retainer part 4, the retaining sections 24, 25 are pressed into the openings 15, 16 by the insertion forces until they rest against the edge of the opening. As a result, the retainer part 4 is additionally supported on the base part 2. This therefore avoids the risk of an excessive deformation or overloading of the flexible wall elements 32, 33.

The secure connection of the retaining sections 24, 25 promotes a short overall length of the holder 1 in the longitudinal direction. The invention is not, however, limited to such an embodiment, but can also be used just as advantageously in holder designs in which all of the retaining sections are connected to one another only by means of thin-walled, flexible wall elements.

The retainer part 3 has a single retaining section 35, which is formed by a wall with a U-shaped cross-section, and is in principle embodied in the same way as the retaining sections 24, 25 and is designed for a tubular object with a larger diameter. Like the retainer part 4, the retainer part 3 is connected to the formation 19 by means of an S-shaped, thin-walled, flexible wall element 36 and is connected by means of another S-shaped wall element 37 to the end of the wall section 21. When a tubular object is inserted, the retainer part 3 can rest against a chamfer-shaped surface 38 of a reinforcing rib that connects the wall section 21 to the formation 19.

The retainer part 5 at the other end of the holder 1 is designed for oblong objects with smaller diameters. For this purpose, the inner surface of its U-shaped retaining section 40 is provided with steps and a hollow surface with a small diameter. The retainer part 5 is connected to the end of the wall section 22 by means of an S-shaped, thin, flexible wall element 41 and is connected to the retaining section 25 of the retainer part 4 by means of a U-shaped, thin, flexible wall element 42.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A holder securable to a vehicle with a bolt, the holder made of plastic and operable for vibration-insulated retention of an oblong object such as a pipe in the holder, the holder comprising:
   a base part defining a bolt-accommodating bore and including a frame-shaped support section partially defining a first opening and a second opening;
   a retainer part including a first retaining section and a second retaining section wherein:
      the first retaining section includes a first wall with a U-shaped cross-section having an first apex region proximate to the base part and defining a first recess suitable for accommodating the oblong object, a first hollow inner surface, and defining an first insertion opening located opposite to the first apex region and distal to the base part; a first resilient retaining finger is located at the first insertion opening, protrudes into the first recess, and is operable to hold the oblong object in the first recess;
      the second retaining section includes a second wall with a U-shaped cross-section having a second apex region proximate to the base part and defining a second recess suitable for accommodating the oblong object, a second hollow inner surface, and defining a second insertion opening located opposite to the second apex region and distal to the base part; a second resilient retaining finger is located at the second insertion opening, protrudes into the second recess, and is operable to hold the oblong object in the second recess,
      the first retaining section and second retaining section are arranged adjacent to each other and securely connected to each other in a row so that the first U-shaped wall and second U-shaped wall lie in a plane; and the frame-shaped support section of the base part extends parallel with the plane with the first opening adjacent the first apex region and the second opening adjacent the second apex region;
   a first thin flexible connecting element and a second thin flexible connecting element; and
   wherein the retainer part is integrally formed with the base part, does not directly touch the base part, and is connected to the base part via the first and second connecting elements with the apex regions of the retainer parts suspended above the respective openings in the base part, such that the apexes are movable into the openings of the base part during deformation of the first and second thin flexible connecting elements.

2. The holder according to claim 1, wherein the first opening in the base part is partially defined by an edge, the edge is spaced apart from the first apex region of the U-shaped first wall, and the edge restricts movements of the retainer part in the direction of the base part.

3. The holder according to claim 1, wherein the frame-shaped support section includes a rectangular frame with two longitudinal elements that extend parallel to the U-shaped first wall of the first retaining section, and two transverse elements that connect the longitudinal elements; and the two longitudinal elements and the two transverse elements define the first opening with a rectangular edge.

4. The holder according to claim 3, wherein a first width of the first opening between the two transverse elements is less than the corresponding outer diameter of the U-shaped first wall of the first retaining section.

5. The holder according to claim 4, wherein a second width of the first opening between the longitudinal elements is greater than the corresponding width of the first apex region of the U-shaped first wall of the first retaining section.

6. The holder according to claim 3, wherein one of the longitudinal elements and the transverse elements of the frame includes a reinforcing rib.

7. The holder according to claim 1, wherein the base part includes a flat wall section and the flat wall section has a first end and a second end, the first end connected directly to the frame shaped support section and the second end connected to a second retainer part by a third thin flexible connecting element.

8. The holder according to claim 1, wherein the base part further includes a sleeve part that defines the bolt-accommodating bore, the sleeve part is located on a side of the base part oriented toward the retainer part and is connected directly to the retainer part by the first thin flexible connecting element.

9. The holder according to claim 8, wherein the retainer part is a first retainer part and the holder further comprises a second retainer part, and the sleeve part is located between the first retainer part and the second retainer part.

10. The holder according to claim 1, wherein the base part includes a flat contact surface located on a side oriented away from the retainer part.

11. The holder according to one of claim 1, wherein the base part further includes a resilient finger protruding out from the base part, and a free end of the finger lies in a first plane that is parallel to and spaced from a second plane defined by a contact surface of the base part.

12. A holder operable for vibration-insulated retention of a tube shaped workpiece, the holder securable to a vehicle with a bolt, the holder defining a long axis and a retained axis transverse to the long axis and an insertion axis perpendicular to the long axis and the retained axis; the holder comprising:

a base extending along the long axis and partly defines an opening open along the insertion axis;

a retainer including a U-shaped wall lying in a first plane defined by the long axis and the insertion axis; the U-shaped wall having a closed bottom, an open top, and closed sides connecting the bottom and the top; the retainer partly defining open sides open along the retained axis, and the open top partly defining an insertion opening located opposite to the bottom; and a flexible connecting element; and wherein the holder is flexible between a first relaxed condition, a second insertion condition achievable while the workpiece is being forcefully inserted into the retainer, and a third retained condition when the workpiece is at rest inside the retainer; and the retainer is made of plastic and is integrally formed with the base, the retainer is connected to the base via the connecting element; and, when in the relaxed condition, the bottom of the retainer is suspended spaced above the base at a relaxed distance along the insertion axis; and, when in the insertion condition, the bottom of the retainer is movable to an insertion distance from the base, the insertion distance being less than the relaxed distance, and the opening is located in the base below the bottom of the retainer along the insertion axis, and the bottom of the retainer is movable into the opening of the base during the insertion condition.

13. The holder according to claim 12, wherein the base includes a rectangular frame partly surrounding the opening, the frame including a first longitudinal element extending along the long axis and a second longitudinal element parallel to and spaced from the first longitudinal element; the frame further including a first transverse element extending along the insertion axis and a second transverse element parallel to and spaced from the first transverse element; and the first and second transverse elements connect to the first and second longitudinal elements; to partly define the opening with a rectangular edge.

14. The holder according to claim 12, wherein the retainer further includes a resilient retaining finger connected near the open top of the U-shaped wall and extending into the insertion opening, and the retaining finger is operable to hold the workpiece in the retainer when the holder is in the retained condition.

15. The holder according to claim 12, wherein the connecting element is a first connecting element and the holder further comprises a second connecting element, the first connecting element is located on the U-shaped wall at a top location proximate to the top of the wall, and the second connecting element is located on the U-shaped wall at a bottom location proximate to the bottom of the wall.

* * * * *